(12) United States Patent
Schroeder et al.

(10) Patent No.: US 8,194,581 B1
(45) Date of Patent: Jun. 5, 2012

(54) ACCOUNT HOLDER NOTIFICATION FOR AN INFRACTING MOBILE STATION OR MOBILE DIRECTORY NUMBER (MDN)

(75) Inventors: Derek Andrew Schroeder, Caldwell, NJ (US); Raj Narayanasamy, Plainsboro, NJ (US); Madhu Bharathula, Somerset, NJ (US); Venkat Gaddam, East Brunswick, NJ (US); Julie Weinstein, West Nyack, NY (US)

(73) Assignee: Cellco Partnership, Basking Ridge, NJ (US)

( * ) Notice: Subject to any disclaimer, the term of this patent is extended or adjusted under 35 U.S.C. 154(b) by 711 days.

(21) Appl. No.: 12/264,492

(22) Filed: Nov. 4, 2008

(51) Int. Cl.
*H04W 4/00* (2009.01)
*H04M 3/42* (2006.01)

(52) U.S. Cl. .................. 370/313; 455/414.1; 455/435.1

(58) Field of Classification Search .................. None
See application file for complete search history.

(56) References Cited

U.S. PATENT DOCUMENTS

| | | | |
|---|---|---|---|
| 6,829,591 | B1 | 12/2004 | Bresnan et al. |
| 7,274,943 | B2 | 9/2007 | Trossen |
| 2002/0019227 | A1* | 2/2002 | Hurme et al. ................ 455/433 |
| 2005/0233745 | A1* | 10/2005 | Noguchi et al. ............. 455/433 |
| 2006/0223519 | A1* | 10/2006 | Yahagi ........................ 455/421 |
| 2007/0099609 | A1* | 5/2007 | Cai .............................. 455/428 |
| 2007/0238449 | A1* | 10/2007 | Park et al. ................... 455/417 |
| 2007/0286353 | A1* | 12/2007 | Itoh ................................ 379/37 |
| 2007/0293210 | A1* | 12/2007 | Strub et al. .................. 455/420 |
| 2008/0062992 | A1* | 3/2008 | Sawada et al. ............... 370/392 |
| 2008/0070609 | A1 | 3/2008 | Ackley |
| 2008/0089503 | A1* | 4/2008 | Crockett et al. ......... 379/201.03 |
| 2008/0117809 | A1* | 5/2008 | Wang et al. .................. 370/229 |
| 2008/0125138 | A1* | 5/2008 | Kwak et al. .................. 455/453 |
| 2008/0146259 | A1 | 6/2008 | Chin et al. |
| 2008/0172746 | A1 | 7/2008 | Lotter et al. |
| 2008/0268875 | A1* | 10/2008 | Holland et al. ........... 455/456.6 |
| 2009/0036146 | A1* | 2/2009 | Lamba et al. ............. 455/456.3 |
| 2009/0210886 | A1* | 8/2009 | Bhojwani et al. ........... 719/318 |

OTHER PUBLICATIONS

U.S. Appl. No. 11/785,448, filed Apr. 18, 2007 to Dunne et al.

* cited by examiner

*Primary Examiner* — Andrew Lee

(57) ABSTRACT

A mobile communication network offers notification to an account holder upon occurrence of an infraction of a subscriber selected restriction by operation of one of the mobile stations under the subscriber's account. In the examples, the subscriber can select a directory number/station under the account, a desired one of a number of available restriction options and one or more parameters of the selected restriction. When the mobile communication network detects an infraction, caused by operation of the mobile station through the network, a system or processor obtains a destination address designated for an account holder, for the subscriber's account, such as the directory number for one of the subscriber's stations selected as that of the account holder. The system sends a notification of the infraction intended for the account holder, using the destination address, for example, as a text message sent through the network to the account holder's mobile station.

29 Claims, 6 Drawing Sheets

ACCOUNT HOLDER NOTIFICATION FOR AN INFRACTING MOBILE STATION OR MOBILE DIRECTORY NUMBER (MDN)

TECHNICAL FIELD

The present subject matter relates to techniques and equipment to provide reliable notification to the holder of a mobile communication subscription account, upon determination that a mobile station with a mobile directory number (MDN) under that account has committed an infraction of a usage restriction imposed on the mobile station or MDN by the account holder or subscriber. Notifications also may be provided to the mobile station of the infracting MDN.

BACKGROUND

In recent years, mobile wireless communications have become increasingly popular. Initial implementations of mobile wireless communications, for example in the form of cellular telephone networks, supported circuit switched voice communication services. The carriers developed short message service (SMS) technology to provide text and/or e-mail communications via the wireless communication networks. As the public wireless communication networks have evolved to provide greater bandwidth and packet based services, the industry has developed a variety of data services, such as web browsing, as well as a variety of services using multimedia message service (MMS) technology.

As popularity and demand has grown, subscribers have increasingly obtained service for a number of mobile stations (with individual mobile directory numbers or "MDNs") under one mobile subscriber account with the carrier providing services through the mobile communication network. For example, a family may have mobile phones for both parents as well as a mobile phone for one or more of their children. VerizonWireless, for example, currently offers private customers up to five stations/numbers under one account/billing subscription.

As usage of multiple mobile stations under one plan increase situations arise in which a subscriber may desire to restrict certain use or operations of one or more of the mobile stations under the subscriber's account, for example, to limit voice call, data or message usage so as to avoid excessive usage charges. As another example, a parent may want to limit the time of day usage by a child, for example, to prevent usage during school hours or late at night. Parental control restrictions may also limit the other numbers/phones that the child may call to or receive calls from, impose similar restrictions on messaging and/or impose various content or site restrictions on web surfing, downloading or other data services.

Often, these restrictions have imposed hard limits, that is to say, a service of some restricted type would be blocked if contrary to the restriction. For example, if a usage restriction limited the amount of voice call minutes for a particular mobile station (with a particular MDN), then the network would prevent any further mobile voice call to or from the station after the station user reaches the applicable usage limit.

This type of restriction is analogous to the limitations on usage imposed by prepaid arrangements. Notifications may be provided, as usage nears the limit (pass a soft threshold) and/or when usage is blocked upon reaching the hard maximum limit. However, these notifications were typically provided to the infracting mobile station, e.g. whose usage reached the soft threshold or reached the hard maximum limit. Notifications were not provided to any destination other than the infracting device, e.g. not to another mobile station or terminal of the parent/subscriber/account holder, which limited the ability of the subscriber account holder to deal with the infracting activity.

There have also been situations in which notifications were provided to account holders. For example, a recent FCC Mandate requires a communication to the account holder or subscriber when certain pertinent information on an account is changed, such as when the account password or billing plan had been changed via web access or as a result of a phone call or in-store communication with customer service personnel. To insure effective communication of such notifications, Verizon Wireless implemented a hierarchical delivery approach, which would first try sending an SMS message to the account holder, then if the SMS delivery is not successful, try sending an email, then if the email is not successful, try sending a letter, and if there is not a valid mailing address, a file is sent to customer service for a confirmation call back. This approach utilized one or more electronic delivery methods as the first attempts, which tends to ensure that the communication reaches the customer quickly and at the least cost. However, when those methods are exhausted, the traditional, more costly, communication methods are employed. The account holder notifications, however, were not applied in the context of operation of the mobile stations associated with the subscriber account, particularly in a manner as would notify the account holder of an attempt or actual infraction of a restriction that the subscriber has placed on the particular mobile station.

SUMMARY

The teachings herein improve over the art by providing an effective approach to notifying an account holder of an infraction of a restriction or limitation that the subscriber has chosen to impose on one of the numbers/mobile stations under the subscriber's account.

For example, a disclosed methodology notifies an account holder of an infraction of a restriction regarding communication by a mobile station. This methodology entails detecting an infraction of a subscriber selected restriction, on usage of one of the mobile stations covered under an account of the subscriber with a mobile communication network. The detected infraction is an event caused by operation of the one mobile station through the mobile communication network. In response to the detection of the infraction, a destination address designated for an account holder, for the subscriber's account, is obtained and that address is used to send a notification of the infraction intended for the account holder.

In this way, the account holder may receive notice of an activity of the restricted mobile station that the subscriber views as an infraction of the selected restriction. In a usage control application, such as a parental control of usage of a child's cell phone, the notification informs the parent account holder of the inappropriate activity (attempt or actual breakage of a restriction) by the child's operation of his or her cell phone. The exemplary service implementations described below allow the subscriber to designate one or more MDNs and thus associated mobile station(s) under the account for restriction, select among available restrictions that the carrier offers through the network, and select one or more parameters of each selected restriction. The examples also allow the subscriber to designate one of the MDNs and thus one of the mobile stations under the account as those of the 'account holder' for notification purposes. The infraction notification is typically delivered as a text message to the designated account holder's mobile station, although the notification service may support other types of notification, either as a subscriber selected alternative or as an alternative in the event of a failure to deliver a notification to the account holder's mobile station.

Other disclosed concepts relate to unique software for implementing techniques for providing notification of an infraction by a mobile station, similar to the methodology discussed above. A software product, in accord with this concept, includes at least one machine-readable medium and executable program instructions embodied in or carried by the medium. Execution of the program instructions by a programmable system coupled to a mobile communication network causes the system to perform the functions for providing the relevant infraction notification.

The disclosure also encompasses examples of networks and systems for providing notification of an infraction of a mobile communication restriction, to an account holder.

For example, a disclosed mobile communication network includes a traffic network for provide mobile communications services to mobile stations of subscribers and a usage data aggregator coupled to the traffic network. The usage data aggregator monitors usage of identified mobile stations, including at least one of the mobile stations under an account of one of the subscribers. The usage data aggregator generates a notification request message, upon determining that operation of the one mobile station through the network has involved an infraction of a restriction selected by the one subscriber. The mobile communication network also includes a customer communication system, which receives the notification request message from the aggregator. In response, the customer communication system obtains a destination address designated for an account holder for the one subscriber's account. The system sends a notification of the infraction intended for the account holder, using that destination address.

An example of a customer communication system disclosed herein provides notice to an account holder of an infraction of a restriction regarding communication by a mobile station. The exemplary system includes a business rules database, a preference center directory and a notification request processor. The business rules database stores rules for determining processing of notification request messages received from a mobile communication network. The preference center directory stores subscribers' preference information regarding notifications to be sent by the system. In operation, the notification request processor receives a notification request message from a usage data aggregator monitoring mobile station operations through the communication network. The received notification request message indicates that operation of one of the mobile stations under an account of a subscriber has involved an infraction of a restriction selected by the subscriber. Based on an applicable one of the business rules, the notification request processor obtains a destination address designated for an account holder for the subscriber's account, responsive to the notification request message, from a record for the account in the preference center directory. The notification request processor modifies the notification request message from the usage data aggregator, to add the destination address, which enables the customer communication system to send the notification of the infraction using the designated accounted holder destination address.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 4 is a high-level flow chart illustrating a process for sending one or more notifications upon occurrence of an infraction of a usage control restriction or the like.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present teachings.

The various examples disclosed herein relate to technologies for providing reliable notifications upon determination that operation of a mobile station through a mobile communication network has resulted in an infraction of a subscriber selected restriction imposed on the mobile station's network operations. Although the operation that rose to the level of an infraction is that of the mobile station, the mobile station is often associated with or assigned a mobile directory number (MDN), and for convenience of discussion below, we may at times refer to the infracting mobile station or to the infracting MDN of that station. One or more notifications of the infraction may be sent to the account holder, for example via different message delivery techniques; and in at least some cases, a notification may be sent to the mobile station of the infracting MDN. The notification techniques discussed herein may be applied to infractions of both hard and soft restrictions. A 'hard' restriction would be one that the mobile station can not breach, in which case an infraction would be an attempt to communicate in a manner barred by the restriction. Examples include attempts to exceed a maximum usage limit or send or receive communication with another station identified on a blacklist (for blocking communications). A 'soft' restriction would one that triggers a notification when there is an infraction but for which communication is still permitted. An example of this later case would be when usage reaches or exceeds some threshold but is allowed to continue, e.g. where the threshold is at some level below a maximum usage ceiling or limit.

Figure 1:
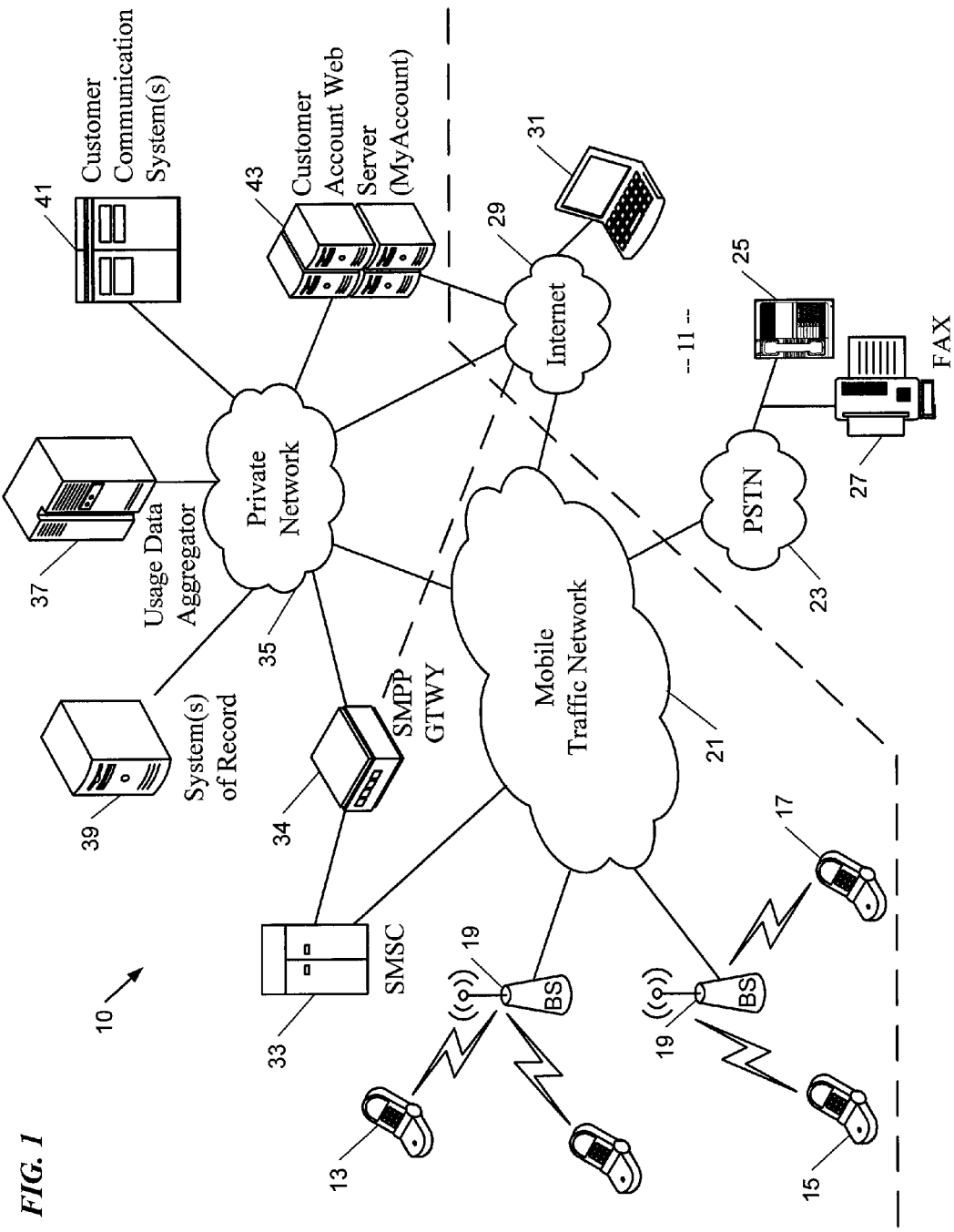
FIG. 1 is a functional block diagram useful in understanding networked elements/systems that may be used in providing mobile service subscribers various notifications, upon determination that a mobile station has committed an infraction of a usage restriction.

Reference now is made in detail to the examples illustrated in the accompanying drawings and discussed below. FIG. 1 illustrates a number of mobile stations, a mobile communication network coupled to other communication networks and several systems/elements associated with or included in the mobile network for various functions as may be involved in monitoring mobile station usage, determining infractions of usage restrictions and providing attendant notifications.

Hence, FIG. 1 illustrates a mobile communication network 10 as may be operated by a carrier or service provider to provide a wide range of mobile communication services and ancillary services or features to its subscriber customers and associated mobile station (MS) users. The elements generally indicated by the reference numeral 10 generally are elements of the network and are operated by or on behalf of the carrier, although the mobile stations typically are sold to the carrier's customers. The mobile communication network 10 provides communications between mobile stations as well as communications for the mobile stations with networks and stations 11 outside the mobile communication network 10.

For purposes of later discussion, several mobile stations appear in the drawing, to represent examples of the mobile stations that may receive various services via the mobile communication network 10. Today, mobile stations typically take the form portable handsets, smart-phones or personal digital assistants, although they may be implemented in other form factors. For discussion of the usage control example (exemplary types of restriction service) and associated exemplary notification service, we will assume that the mobile stations 13, 15 and 17 and their associated MDNs are all covered under one subscriber account, and that among those stations, the mobile station 13 is the station of the account holder (AH).

The network 10 allows users of the mobile stations to initiate and receive telephone calls to each other as well as through the public switched telephone network (PSTN) and telephone stations connected thereto. The network 10 allows SMS type text messaging between mobile stations and similar messaging with other devices via the Internet. The network 10 typically offers a variety of other data services via the Internet, such as downloads, web browsing, e-mail, etc.

The mobile communication network 10 typically is implemented by a number of interconnected networks. Hence, the overall network 10 may include a number of radio access networks (RANs), as well as regional ground networks interconnecting a number of RANs and a wide area network (WAN) interconnecting the regional ground networks to core network elements, such as the MMSCs. A regional portion of the network 10, such as that serving mobile stations 13, 15 and 17, will typically include one or more RANs and a regional circuit and/or packet switched network and associated signaling network facilities.

Physical elements of a RAN operated by one of the mobile service providers or carriers, include a number of base stations represented in the example by the base stations (BSs) 19. Although not separately shown, such a base station 19 typically comprises a base transceiver system (BTS) which communicates via an antennae system at the site of base station and over the airlink with one or more of the mobile stations 13, 15 and 17, when the mobile stations are within range. Each base station typically includes a BTS coupled to several antennae mounted on a radio tower within a coverage area often referred to as a "cell." The BTS is the part of the radio network that sends and receives RF signals to/from the mobile stations that the base station currently serves.

The radio access networks also include a traffic network represented generally by the cloud at 21, which carries the user communications for the mobile stations 13, 15 and 17 between the base stations and other elements with or through which the mobile stations communicate. Individual elements such as switches and/or routers forming the traffic network 21 are omitted here form simplicity.

A Mobile Directory Number (MDN) is the telephone number assigned to a mobile station, which a calling party or device inputs in order to call or send a message to the particular mobile station. To call the mobile station 15, for example, a user of a PSTN telephone or of another mobile station dials the MDN associated with the mobile station 15. To send a MMS message or a SMS message to destination mobile station 15, as another example, typically entails input of the MDN of that mobile station. A Mobile Identification Number (MIN) is an identification number used by the network 10 to signal a particular mobile station. The MIN is formatted like a telephone number, and the MIN may be the same as the MDN. However, increasingly, the network assigns a different number for use as the MIN and translates the MDN input by a calling or other originating party into the MIN that the network 10 uses to establish the call or send the message to the destination mobile station. Of these numbers assigned to the mobile station, the MDN typically is the number or address of the station known and used by other parties or stations.

The traffic network portion 21 of the mobile communication network 10 connects to a public switched telephone network 23. This allows the network 10 to provide voice grade call connections between mobile stations and regular telephones connected to the PSTN 23. The drawing shows one such telephone at 25. For purposes of discussing notifications, some notifications may entail voice message delivery or even service representative calls to the account holder, for example, at a regular telephone such as telephone 25 via the PSTN 23. The PSTN 23 also provides connections to other types of customer premises equipment, such as facsimile or 'FAX' machines. The drawing shows one FAX machine 27, by way of example, to illustrate the point that an account holder notification may entail a facsimile transmission of the notification message to the account holder's FAX machine, such as the machine 27.

The traffic network portion 21 of the mobile communication network 10 connects to a public packet switched data communication network, such as the network commonly referred to as the "Internet" shown at 29. Packet switched communications via the traffic network 21 and the Internet 29 may support a variety of user services through the network 10, such as mobile station communications of text and multimedia messages, e-mail, web surfing or browsing, programming and media downloading, etc. For example, the mobile stations may be able to receive messages from and send messages to user terminal devices, such as personal computers, either directly (peer-to-peer) or via various servers (not separately shown). The drawing shows one such user terminal device as a personal computer (PC) at 31, by way of example. For purposes of discussing notifications, some notifications may entail an e-mail message transmission of the notification to the account holder's terminal, such as to the PC 29 via the Internet 29.

Wireless carriers developed the short message service (SMS) to transmit text messages for display on the mobile stations. In many existing network architectures, the SMS traffic uses the signaling portion of the network 21 to carry message traffic between a Short Message Service Center (SMSC) 33 and the mobile stations. The SMSC supports mobile station to mobile station delivery of text messages. However, the SMSC also supports communication of messages between the mobile stations and devices coupled to other networks. For example, the SMSC 33 may receive incoming IP message packets from the Internet 29 for delivery via the network 21, one of the base stations 19 and a signaling channel over the air link to a destination mobile station. For this later type of SMS related communications, the network 10 also includes one or more Short Message Peer-to-Peer (SMPP) protocol gateways 34. The SMPP gateway provides protocol conversions, between SMPP as used by the SMSC 33 and the protocols used on the Internet 29 or other IP network. SMPP messages ride on IP transport, e.g. between the gateway 34 and the SMSC 33.

Of note for purposes of this discussion, many of the notifications discussed herein are sent to various mobile stations using SMS capabilities of the network 10. For example, when a mobile station 17 commits an infraction of a restriction that the account holder has set-up against the MDN of the station 17, then the network 10 will provide a notification of the infraction in the form of an SMS message sent via the SMPP gateway 34, the SMSC 33, the traffic network 21, one of the base stations 19 and a signaling channel over the air link to the mobile station 13 of the account holder. In some cases, the network 10 may also send an SMS message to the station of the user that committed the infraction. Hence, in our example, when the mobile station 17 commits the infraction, the network 10 might also provide a notification of the infraction in the form of an SMS message sent via the SMPP gateway 34, the SMSC 33, the traffic network 21, one of the base stations 19 and a signaling channel over the air link to the mobile station 17 itself.

The carrier will also operate a number of systems that provide ancillary functions in support of the communications services provided through the network 10, and those elements communicate with other nodes/elements of the network 10 via one or more private IP type packet data networks 35 (sometimes referred to as an Intranet). The support elements, for example, include one or more systems of record, such as the system shown at 39. An example of such a system 39 is a Vision system, which includes subscriber account records. A large carrier typically has a number of such systems, and the system that stores the account data for a particular subscriber may be referred to as the "system of record" for that subscriber's account.

As discussed more later, with regard to FIG. 2, the customer communications system 41 also includes or has access to a preference center system 53 that forms a system of record, which includes a record for the mobile stations 13, 15 and 17. That record identifies the mobile stations 13, 15, 17, and the MDN of the mobile station identified as the account holder (AH) for notification purposes. In a parental usage control example, the parent would designate the MDN of the parent's mobile station 13 as the MDN for the account holder. The AH designated MDN may be the main subscriber number under which the account was originally established, if that is still the parent's own number, but the subscriber may change the AH designation to another of the numbers under the account.

For purposes of the infraction detection and associated notification, another ancillary carrier system of the network 10 is a usage data aggregator 37. In our example, we assume that the account of the mobile stations 13, 15 and 17 has subscribed to the parental control type usage restriction service, and the subscriber has instructed the network to apply one or more usage control restrictions to the two mobile stations 15 and 17 under the subscriber's account. The usage data aggregator 37 will monitor real time usage of the mobile stations 15 and 17 through the mobile traffic network 21. Trigger events with regard to usage by the mobile stations 15 and 17 also are defined in the data aggregator 37. If an event corresponding to a trigger defined by a subscriber selected restriction occurs in the network operation of one of the mobile stations 15 and 17, the usage data aggregator 37 will detect that event and generate an infraction notification request message for transmission via the network 35.

The aggregator 37 may be similar to real-time call or usage rating platform originally developed for prepaid services. Such a platform, however, may be adapted to usage monitoring for postpay subscription services as well, for example, where it is desirable to monitor and possibly restrict amount of usage or other aspect of mobile station operations in realtime. An example of a suitable platform, which may be adapted to perform the functions of the usage data aggregator 37, is the Surepay® platform manufactured and sold by Alcatel-Lucent.

The exemplary network 10 also includes a customer communications system 41, which is coupled for communication via the private network 35. The customer communications system 41 receives the infraction notification request message from the usage data aggregator 37, and in response, generates and sends one or more notification messages. For example, the customer communications system 41 may generate and send SMS messages, one to the mobile station 13 designated as that of the account holder and/or an SMS message to the mobile station 17 that committed the infraction. In the examples discussed in more detail below, the customer communications system 41 also supports alternative messaging, for example, in the form of facsimile, voice or e-mail messages. The customer communications system 41 may utilize those alternative message communication capabilities for infraction notifications or for other types of notification communications that the carrier may offer to its subscribers, e.g. to provide notifications of significant account activities such as on-line access to add a number/station or to change the primary password on the account.

In practice today, the carrier will also offer its subscribers on-line access to a variety of functions related to the subscribers' accounts, such as review of billing statements and usage data, on-line payment, subscription changes, password control or the like. For that purpose, the carrier in our example operates a customer account web server 43, offering a 'MyAccount' (Now MyVerizon) type subscriber interface via the Internet. Hence, a user's terminal, such as PC 31, may be used to access on-line information about a subscriber's account, which the mobile carrier makes available via the carrier's MyAccount web site accessible through the Internet 29. Of note for purposes of the present discussions of notifications, the web site provides secure user access to the restriction features and allows the subscriber to designate the MDN for the account holder's mobile station 13.

For example, the subscriber may use the PC 31 to log-in via the site offered by the server 43 to subscribe to usage restrictions and identify the MDNs of mobile stations 15 and 17 under the subscriber's account as subject to the restrictions. In an exemplary deployment, a number of options for different usage controls are available, and the web site allows the subscriber to select the control(s) to apply to each MDN covered by the usage controls. As noted, the web site also allows the subscriber to select an MDN for the AH designation, and we will assume for discussion of further examples that the subscriber selects the MDN for the mobile station 13 as that of the account holder. The server 43 communicates with other network systems via the private network 35, for example, to store the subscription information and account holder designation in the systems of record 39 and 53. For example, when the customer subscribes to usage restriction service and designates an MDN for the account holder, the MyVerizon application in the server 43 sends an XML over HTTP request to the CCC request processor in customer communications system 41, to notify the subscriber of this account change in accord with the applicable business rules. However, this notification request per the business rules also causes the CCC request processor to set the account holder designation appropriately in the preference center 53. Appropriate triggers for the restricted MDNs are also loaded into the usage data aggregator 37. If the system offers reporting options to the subscriber, such as options to select alternative notifications in the event that a SMS notification to the account holder fails, the applicable notification choices also may be stored as subscriber preferences in the preference center directory 53 maintained by the customer communication system 41.

With that overview of the system, it may be helpful now to consider a high-level discussion of an example of a restriction service with associated infraction notifications, including how these services might appear from the user or subscriber's point of view.

In a current implementation, usage control is a subscription feature that allows a subscriber to select one or more of the MDNs (and thus the associated mobile stations) under the subscriber's account with the mobile network carrier, and apply one or more restrictions to each selected MDN. Examples of possible usage control type restrictions offered for the feature include a voice call usage threshold, a voice call usage maximum limit, a message communication usage threshold, a message communication maximum limit, a data communication usage threshold, a data communication maximum limit, a time of day or day of the week restriction, as well as one or more types of blockage restrictions regarding communications with regard to an identified station or the like of another party. Blockage restrictions for example may include a blockage or "blacklist" of numbers or other addresses of stations/parties with which a mobile station (identified by its own MDN) is not allowed to communicate. Another example of a blockage type restriction might be a "white" list of allowable numbers or other addresses of stations/parties with which the particular mobile station is allowed to communicate, when other numbers/addresses are blocked either permanently or during periods of restriction under a time of day/day of the week type restriction.

In operation, the subscriber would use their personal identification number and a password to log onto their own account page at the carrier's website, using a PC 31 and the web server 43. Once the customer has subscribed to the usage control feature, the subscriber would select one or more MDNs under their account that are to be the subject of a usage control restriction. In our example, the subscriber selects the MDNs for the mobile stations 15 and 17, for application of usage control restrictions.

For each MDN selected for a usage control restriction, the web server 43 offers options among the available types of restrictions. The subscriber can then select one or more of the available restrictions to apply to each selected MDN/mobile station under the subscriber's account. For each restriction, the web server 43 may also offer one or more control parameters that the subscriber may choose and set. For example, for a time of day restriction, the subscriber can select the appropriate time periods (e.g. as start and stop times of the restricted usage period, as start times with associated durations, or by other convenient means of selecting applicable intervals). As another example, for usage thresholds or limits, the subscriber can select a threshold or a maximum limit on the usage units (call minutes, message units, data volume or the like) allocated to each restricted MDN. In a current implementation, the subscriber selects a maximum limit for the usage allocation for the restricted MDN, and the system sets a threshold at a predetermined level somewhat below that maximum limit, essentially to provide a threshold for a warning as usage nears the limit. The web server 43 would also offer the subscriber options to set-up blockage restrictions, by entering numbers/addresses for a blacklist or a white list.

The usage control feature also allows the subscriber to select one of the MDNs under the account, and thus one of the mobile stations, for designation as the MDN/station of the account holder for notification purposes. Hence, web server 43 offers the subscriber a selection option, and the subscriber selects the appropriate MDN under the account for the holder, such as the MDN of the mobile station 13 in our example.

Once the subscriber has made the various selections for the usage control service, relevant data is stored in the systems of record, that is to say in the preference center 53 in the case of the infraction notification service. Other elements of the mobile communication network 10 are provisioned based on that data, so as to implement the subscriber selected usage controls and to provide the appropriate notifications of infractions.

For example, the mobile traffic network is provisioned so as to report usage activities of the restricted MDNs/mobile stations such as 15 and 17 to the usage data aggregator 37, and the data aggregator is provisioned to monitor operations of those MDNs/mobile stations and determine if/when operations of any of the restricted mobile stations through the network 10 create an infraction of any of the subscriber selected restrictions. One approach may be to provision the network 21 to treat the MDNs/mobile stations 15 and 17 in a manner similar to those of prepaid subscribers, so as to look to the usage data aggregator 37 before allowing communications, to report usage to the usage data aggregator 37 in real time and to terminate ongoing communications and/or block new communications attempts if so instructed by the usage data aggregator 37. In this way, the data aggregator can impose actual limits on activities of the restricted mobile stations 15 and 17 if desired by the subscriber. The usage data aggregator 37 can also monitor the activities of the restricted mobile stations 15 and 17 to detect infractions, for reporting purposes.

In the illustrated example, when the usage data aggregator 37 detects an infraction, it generates and sends a notification request message to the customer communication system 41. One approach would be for the usage data aggregator 37 itself to send one or more notifications, but the exemplary approach reduces the workload on the data aggregator 37 and facilitates application of more sophisticate logic or 'business rules' to the notifications regarding various types of infractions and/or as selected or preferred by the various subscribers. Hence, in the mobile communication network 10, the data aggregator 37 generates a request message for a notification to be sent to the MDN of the mobile station that the aggregator detected has committed an infraction of an applicable subscriber selected usage restriction, and the usage data aggregator 37 sends that notification request message through the carrier's private network 35 to the customer communication system 41.

The customer communication system 41 receives the notification request message and processes that message to determine where to send one or more notifications regarding the infraction. Of note for purposes of the usage control example, this entails a lookup of relevant account information to obtain a destination address of the designated account holder for the subscriber's account. Typically, this will be the MDN of the mobile station 13 that the subscriber selected as the MDN for the account holder. Using that destination address, the customer communication system 41 sends a notification of the infraction intended for the account holder. In the example, this typically entails sending an SMS message addressed to the designated account holder's MDN through the SMPP gateway 34 to the SMSC 33, which stores and forwards the SMS notification message through the mobile traffic network 21 to the account holder's mobile station 13. Typically, the customer communication system 41 similarly sends an SMS notification message to the mobile station 15 or 17 that committed the infraction, using the MDN of the appropriate station as the address of the SMS notification message. The system supports at least some situations in which a notification may be sent to the infracting MDN/station without sending a notification for the account holder. However, most of the notification operations considered in the examples discussed here at least include an account holder notification.

Figure 2:
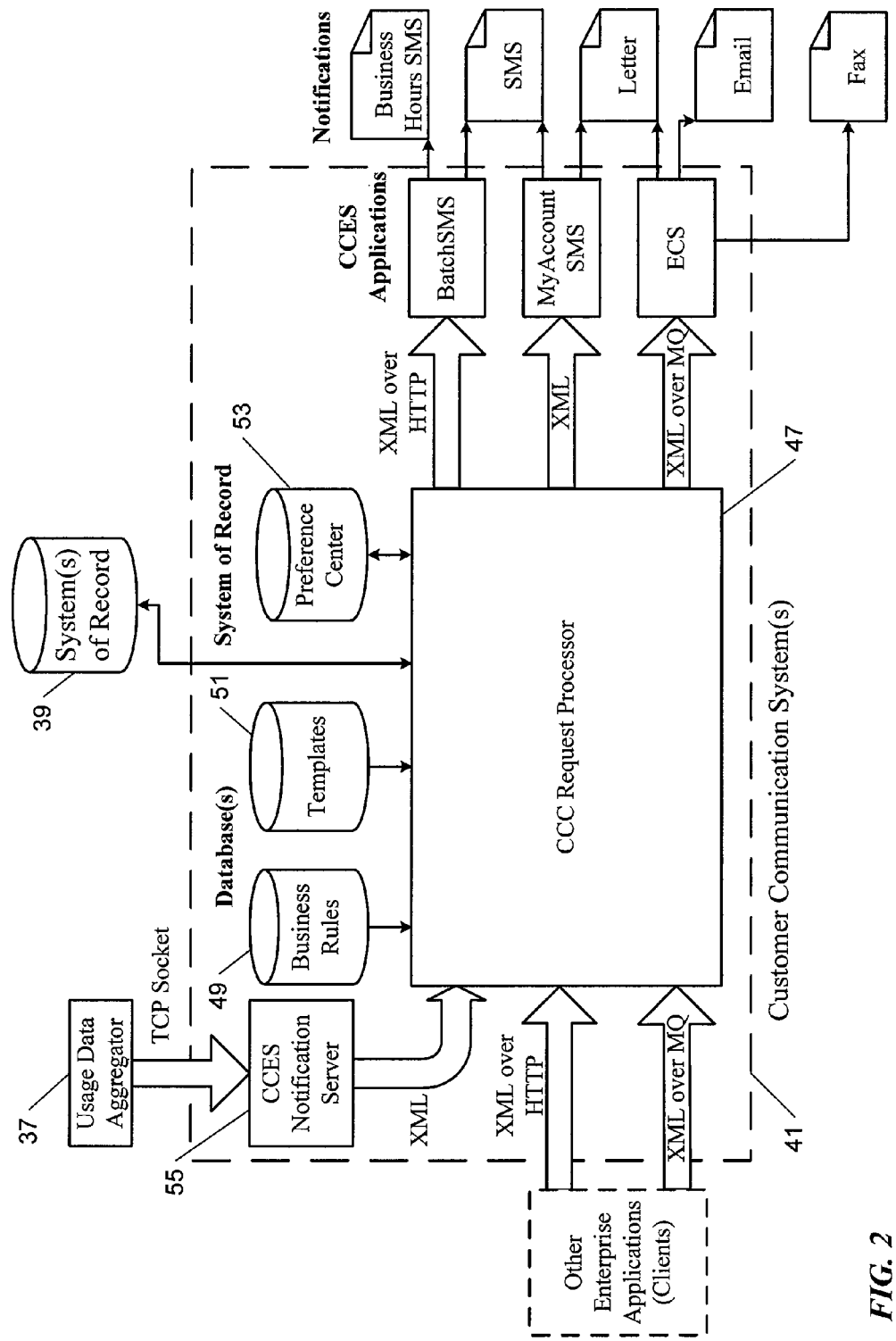
FIG. 2 is a functional block diagram useful in explaining an implementation of a customer communication systems involved in providing notifications to mobile users, including those provided upon occurrences of usage control infractions.

FIG. 2 depicts software and associated functionalities, in block diagram form, where the software may be run on the hardware of a host or server type computer or system of such computers, to implement the customer communication system 41; and that drawing illustrates several other elements that communicate with that system for providing notifications to mobile users, including those provided upon occurrences of usage control infractions. For example, the drawing shows the usage data aggregator 37 as well as the systems of record 39 and 53, in this case a Vision type billing system 39 and preference center 53. In the example, the customer communication system is implemented as an enterprise middleware web service written in Java that receives notification requests in the form of XML via HTTP or MQ, and follows business rules to send customer notifications and update systems of record. In general, these communications may utilize pre-existing CCES web services to facilitate the sending of text message, Email, letter, and fax notifications. Hence, the customer communication system 41 may be implemented as middleware, that is to say, in this example, as software for implementing a CCC notification request processor 47, one or more databases 49 and 51, and a directory 53, as will be discussed in more detail below.

Although shown as a common platform at 41 in FIG. 1, the elements of the customer communication system 41 of FIG. 2 may be implemented on separate hardware communicating with each other via a network the same as or similar to network 35. For example, one or more of the databases 49, 51 and 53 typically will be implemented as separate servers in communications with the hardware platform(s) implementing the CCC notification request processor 47, although the databases may be implemented as records and appropriate application software running on the same computer as the middleware for the CCC notification request processor 47. The preference center directory 53, for example, may be implemented as a LDAP server coupled for communication with the computer running the CCC notification request processor 47 programming.

The CCC notification request processor 47 receives notification requests, processes them and provides the processed requests to associated messaging applications that send the desired notifications out via one or more delivery techniques. In the illustrated implementation, the CCC notification request processor 47 provides such notification services for a number of enterprise applications, as well as for infraction notifications responsive to infractions detected via the usage data aggregator 37. For example, the other enterprise applications may trigger notifications of certain activities on a subscriber's account, such as when a customer uses the online web service through server 43 to change their address, email address, MyAccount challenge question, MyAccount password, MyAccount secondary email addresses, or Vision password. In any such case, the CCS request processor 47 will send a notification to the customer following specific notification logic and provide fallout files by area when the notification cannot be made.

As a specific example of a restriction on MDN or mobile station operation, Usage Control is a revenue generating parental control feature for MyAccount customers that provides the account holder with the ability to manage their billable usage and place restrictions on the mobile devices under their account. In the example of FIG. 2, the customer communication system 41 supports notification delivery upon infractions of the restrictions applied via the Usage Control feature. Hence, when a MDN under an account triggers a certain infraction notification to occur, the account holder should also receive a notification. The system 47 will check the system of record to determine the MDN and/or email address of the account holder when the web service receives a notification request for a MDN under the account, and the system sends notifications to the account holder and the infracting MDN.

Of note, the proposed example of the CCC notification request processor 47 receives notification requests in XML format. A number of business applications or clients deliver such notification requests in XML format. Where the platform functioning as the usage data aggregator 37 for Usage Control service is a SurePay® platform from Alcatel-Lucent, however, that platform cannot send notification requests as XML over Hypertext Transfer Protocol (HTTP) or Message Queuing (MQ), like the other CCES client applications use in the illustrated implementation example. Hence, the system of FIG. 2 includes a TCP/IP socket based interface, in the form of CCES notification server 55, to facilitate the infraction notifications. To the 'client' application of the usage data aggregator 37, this interface appears as a server 55, and this interface will act as a broker between the data aggregator 37 and the CCES notification middleware, particularly the request processor 47. For example, the notification server 55 parses each message from the usage data aggregator 37 to form an XML message appropriate for delivery to the CCS request processor 47. A regular expression based parser may be used to extract each field from the name value pairs contained in each of the notification request messages from the usage data aggregator platform. In the example, these fields are used to construct a CCC XML notification request following the CCC XML schema used as inputs to the CCC request processor 47.

The customer communication system 41 will include or have communication access to a number of databases that store information used in performance of various notification related functions. In the example, the customer communication system 41 includes a database 49 of business rules and a database 51 of notification message templates. The rules in the database 49 provide the logic for determining what notifications to send in response to the various events reported by the usage data aggregator 37 and the other enterprise applications. The template database 51 provides the format and common content, e.g. forms or templates, for the various notification messages sent out by the system 41.

The Preference Center is the system of record for communication preferences and account holder designation. Communications with this systems of record 53 provide the CCS request processor 47 with information that is useful in processing of various notifications, including notifications regarding MDN infractions. The systems 53 and 41 communicate using XML, via the network 35, to store and retrieve the preference and account holder data from system 53.

Thus, the preference center directory 53 stores preference data regarding notifications for various network customer accounts that may be subject to notifications. For the infraction reporting feature, the preference center directory 53, for example, stores the MDN of the account holder as designated by the subscriber. The directory may store other notification preference information for the subscriber account, for infraction notifications and/or for other notifications that the carrier may want to provide to the subscriber, such as other notification destination addresses, a preferred language for the notification messages (e.g. English or Spanish), etc. The language for the notification also may be specified by a field or parameter of the notification request message, as provisioned in the usage data aggregator with regard to the MDNs of the monitored mobile stations 15, 17. The CCS request processor 47 communicates with the Preference Center application that updates its directory 53 using the Lightweight Directory Access Protocol (LDAP).

The customer communication system 41 also runs one or more message output applications, identified as CCES applications in FIG. 2, for processing the notification request messages output from the CCC notification request processor 47, as needed to generate and send the actual notification messages through one or more communication delivery channels. The CCC notification request processor 47 modifies notification request messages based on its processing and outputs the modified notification request messages in XML format to the appropriate one or more of the CCES applications, to send the actual notifications. The CCES applications comprise application programming software, which may run on the same or a different computer from the CCC notification request processor 47.

The CCES applications enable the customer communication system 41 to provide notifications, including notifications regarding the MDN infractions and notifications for the other enterprise applications, using a number of communication techniques, as shown by way of example to the right of FIG. 2. Some messages may be batch processed for SMS communications or sent in real time in response to triggering events as represented by the MyAccount SMS processing in the drawing. Batch SMS communications may be limited to business hours if desired or sent at any time of the day. Event responsive notifications, such as those for the MDN infraction notifications, would be sent in real-time as the infraction events are detected and processed through the customer communication system 41. The customer communication system 41 also supports other types of notifications, such as e-mail, letter, or facsimile transmissions via an Enterprise Communication Services (ECS) function.

At least in an initial deployment, the MDN infraction notifications will typically utilize SMS message transmission to the mobile station of the account holder and/or to the mobile station/MDN that has committed the infraction. Obviously, the notification service for infractions of usage control could be adapted to offer alternative notification delivery, either based on a preference or upon failure of SMS message delivery.

The customer communication system 41 could be implemented on a single hardware platform. However, to provide effective notification services for a large number of customers and a large volume of trigger events, the customer communication system 41 for the usage control associated example of infraction notification service and other enterprise applications requiring notification may utilize a distributed system architecture. Hence, FIG. 3 is a network diagram of an exemplary hardware platform for the CCES notification service in support of the usage control service.

Figure 3:
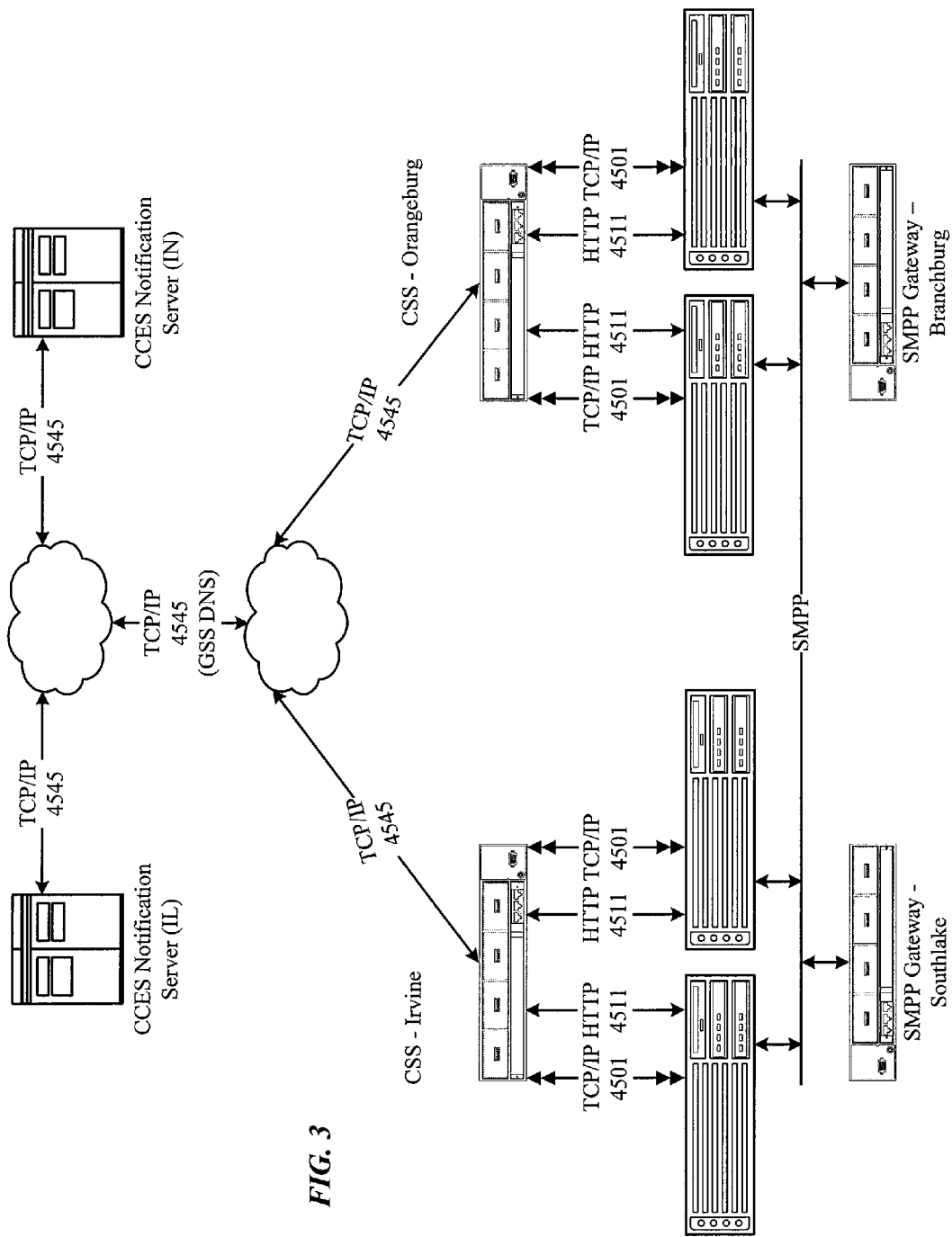
FIG. 3 is a network diagram of an example of hardware as may be used for usage control related infraction notifications.

In the example of FIG. 3, the distributed hardware platform for the CCES Notification Service includes two clusters with DNS with Global Site Selector (GSS) or other load balancing. Each cluster includes two Sun T2000 Servers, configured as CCES Notification Servers (e.g. Each hosted at a data center in a different region). There will be a Cisco Content Services Switch (CSS) or other load balancer in each cluster that will balance load to the active nodes in the cluster. Each node will listen on a TCP/IP socket for usage control notifications from one or more of the usage data aggregators and on an HTTP port for a CSS keep-alive signal. In the exemplary system architecture of FIG. 3, there can be up to a maximum of 32 simultaneous connections from the data aggregator platform(s) to the CCES usage control notification service. The CCES CCC service connects to the SMPP gateway(s) to deliver the SMS notifications to the customers. In the exemplary system architecture of FIG. 3, there can be up to a maximum of 20 simultaneous connections from the customer communication system to the SMPP gateways. The CCC software will throttle the SMPP messages to avoid reaching the SMPP gateway throttle limits.

The exemplary system architecture will be highly available and fault tolerant. Those skilled in the art will recognize, however, that other system architectures may be used, e.g. to meet the demands of increased event and notification traffic relative to the usage control service and/or other enterprise applications that require customer notifications.

The usage data aggregator platform will send notification requests to the CCES Notification Service servers via TCP/IP sockets. Multiple TCP/IP socket connections can be made to each CCES Notification Server. Each TCP/IP Socket connection will remain open indefinitely and receive and acknowledge notification requests one at a time. If the TCP/IP socket connection to CCES is severed, the usage data aggregator platform will need to reestablish it and resend any notification that was not acknowledged. Acknowledgements from the customer communication system will indicate that each of the messages was received for processing, but will not provide any detail into the success or failure of SMS delivery.

As outlined above, the notification server function provides an application program interface or API between the usage data aggregator and the CCC notification request processor. This API enables an exchange of information between systems using standard TCP/IP Sockets protocol. In an example, there is one process running in the customer communication system that will receive messages from data aggregator. This process may be a multi-threaded, socket-based listener. The messages and acknowledgements may be sent in a synchronous fashion. That is, the usage data aggregator will wait for an acknowledgement from customer communication system for every message sent before it continues sending more messages. If there is no acknowledgement from the system, then the data aggregator will try to resend the message after a determined/set period of delay.

In an exemplary implementation, each notification request message from the usage data aggregator contains the following name-value-pair fields. If the length of any parameter is less than the length defined, the blank is padded from the right.

APP (3 characters)
ACT (16 characters)
MDN (10 characters)
MIN (10 characters)
TOD (4 characters)
DOY (8 characters)
DIR (2 character)
ADR (32 characters)
TOS (4 characters)
EVT (6 characters)
UNI (3 characters)
BAL (12 characters)
LNG (3 characters).

Both the field names and values are included in the messages as octet strings: <Name> <Value>. <Name> will always be a 3-octet string. <Value> has variable length defined as follows.

Table 1 below provides additional information regarding the information contained in the fields of the notification request messages, for an exemplary implementation of infraction notifications regarding a usage control service (where for the example, M in the M/O column designates a mandatory field and O designates an optional field).

TABLE 1

| Field | Meaning | M/O | Length | Value |
|---|---|---|---|---|
| APP | Application ID | M | 3 | It is always "UCS" for usage control service |
| MDN | MDN | R | 10 | 10 Digit Number |
| MIN | MIN | O | 10 | 10 Digit Number |
| TOD | Time of Day | O | 4 | HHMM in military format. HH ranges from 00 to 23 MM ranges from 00 to 59 |
| DOY | Date of Year | O | 8 | MMDDYYYY MM ranges from 01 to 12 DD ranges from 01 to 31 YYYY ranges from 0000 to 9999 |
| DIR | Call direction | O | 2 | MO: Mobile origination MT: Mobile termination FW: Forwarded calls |
| ADR | Calling/Called Party Address | | 32 | Numeric phone numbers or email address. Context determines the content of this value: DENBLK: ADR shall be populated with the first blacklist number DENTOD, DENLMT, DENINS: the first number/email if available NOTSUC, NOTRST: none ALTNEA, ALTLMT, DISTOD, DISLMT: the first number/email if available |
| TOS | Type of Service | R | 4 | VOIC: voice call SMSC: short message MMSC: multimedia message PACK: data transport BREW: Brew service ADMN: administration cause, e.g., monthly allowance reset. |
| EVT | Notification event | R | 6 | DENBLK: denied by blacklist number DENTOD: denied because of time of day restriction DENLMT: denied because of allowance limit has been reached DENINS: denied because of insufficient fund/allowance to support the service NOTSUC: notification after successful service delivery NOTRST: notification after monthly allowance reset ALTNEA: alert for near-threshold being reached ALTLMT: alert for monthly limit being reached DISTOD: alert for disconnection due to TOD DISLMT: alert for disconnection due to allowance limit |
| UNI | The unit of the remaining allowance | O | 3 | MIN: Minutes MSG: Message numbers MGB: Megabytes data USD: US dollars |
| BAL | The remaining allowance in decimal | O | 12 | Any decimal number (e.g., 4, 10, 409, 23.98) |
| LNG | Preferred language | O | 3 | Use the language code defined in ISO-639-2. English - eng Spanish - spa |
| ACT | Billing Account ID | R | 16 | A 16-octect billing account id for the MDN. The billing account id will be provisioned into each MDN's profile on the data aggregator automatically. |

The CCES software for notification services may be written in Java. Each CCES Notification Server node in the example has an instance of Websphere running the CCES notification software and the CCC/MyAccountSMS software on the same Java Virtual Machine (JVM). This allows the usage control service to utilize all of the features of the customer communication system including: SMS notifications, EMS notifications, MMS notifications, Email notifications, fax notifications, letter notifications, notification templates, rules based failure notifications, preference center lookups, and weekly reports. EMS (Enhanced Messaging Service) is an application-level extension to Short Message Service (SMS) for cellular phones available on GSM, TDMA and CDMA networks. The CCC software, for example, makes the preference center lookups on the account number provided in the notification request to send SMS notifications to the Account Holder.

For discussion of the following example, "primary" SMS messages are those sent to the infracting MDN, that is to say to the MDN identified in the infraction notification request from the usage data aggregator 37. At least some notification requests generate an additional or "secondary" SMS message that is sent to the Account Holder's MDN. The Account Holder's MDN is obtained via a Preference Center LDAP lookup, using the account number contained in the infraction notification request from the data aggregator. In a current implementation, the account number takes the format of a 9-digit account number followed by a hyphen character followed by a 5-digit customer id number.

Figure 4:
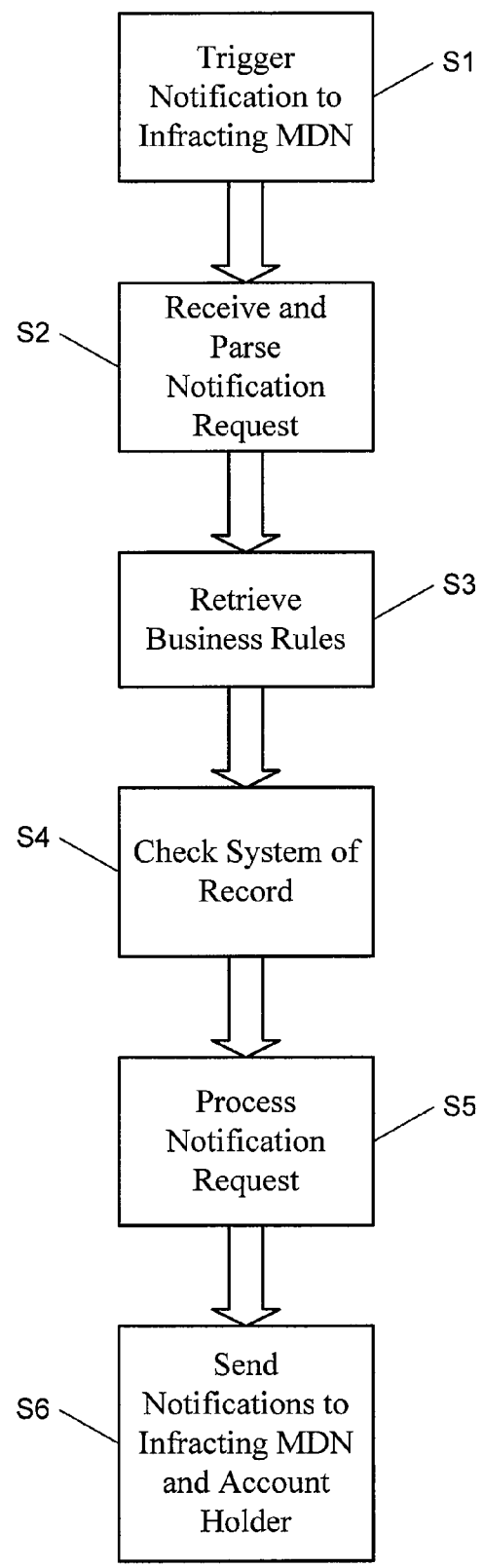
Figure 5:
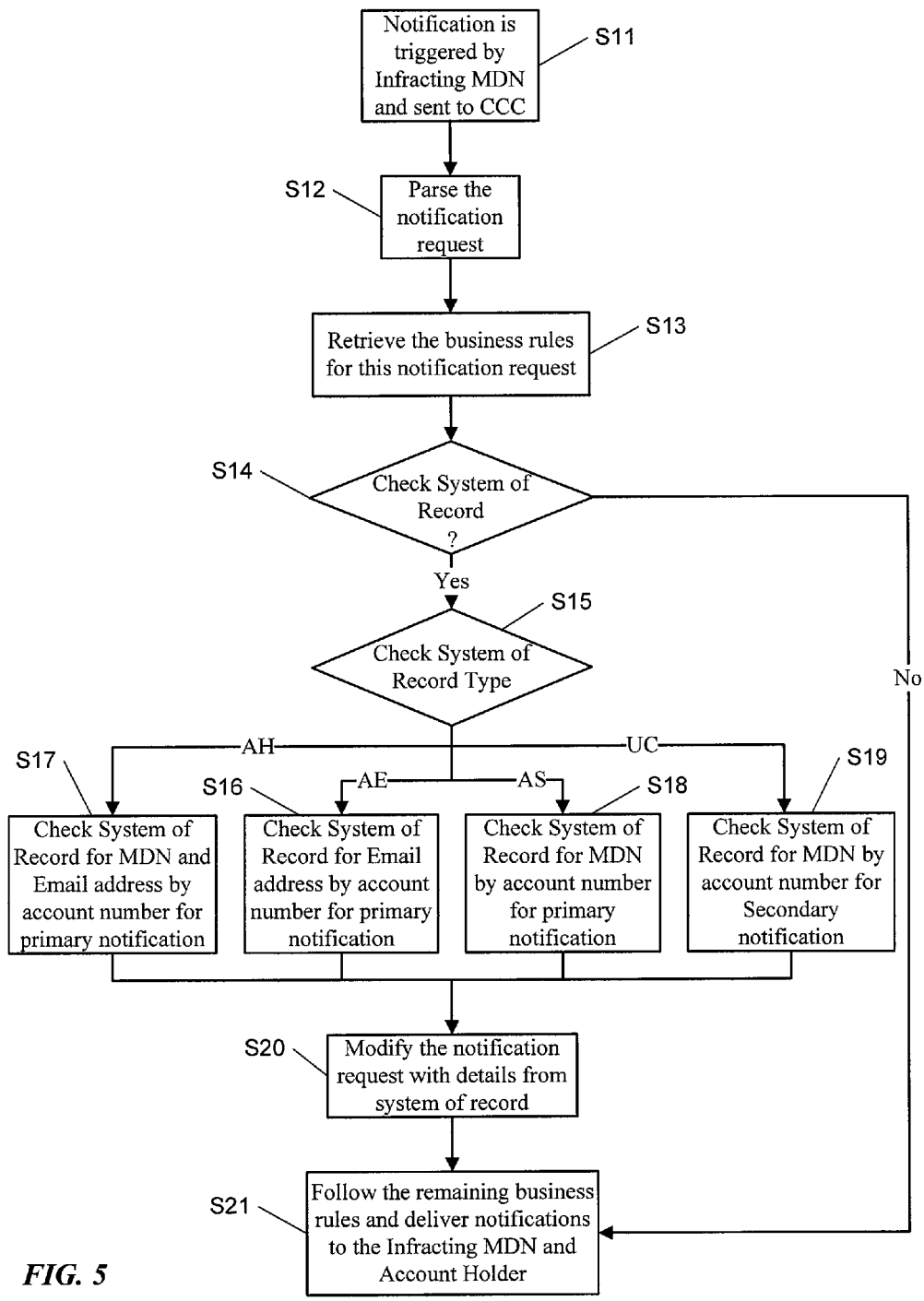
FIG. 5 is a flow chart illustrating a process similar to that of FIG. 4 but showing somewhat more details of exemplary operations for some portions of the notification procedure.

The flow chart of FIG. 4 provides a high level illustration flow for an example of an infraction notification procedure. FIG. 5 shows a somewhat more detailed exemplary procedure. For purposes of the discussion of these processes, we will assume that the subscriber has subscribed to a usage control service, such as outlined earlier, and under that type of restriction service, has selected to apply one or more restrictions, particularly a restriction on voice call usage per month by a mobile station 15 having an assigned MDN. The subscriber also has designated the MDN of mobile station 13 as that of the 'account holder.'

The infraction processing (FIG. 4) begins with detection of an infraction. In our example, this may occur when the mobile station 15 crosses a threshold of voice call usage a set value below the limit selected by the subscriber or when the user of mobile station 15 reaches the selected voice call limit. In the mobile communication network 10 of FIG. 1, the usage data aggregator 37 monitoring the voice call usage by the mobile station 15 detects the infraction event and generates and sends a notification request message with the relevant information to the customer communication system 41. At step S1 in the process of FIG. 4, the CCES notification server 55 receives the notification request message, essentially as the trigger for notification to the infracting MDN (to the mobile station 15 that has the particular MDN). From the overall point of view of the network 10, the usage data aggregator initially detects the infraction. However, from the point of view of the customer communication system 41, the system 41 detects the infraction by receiving the notification request message regarding the infraction from the usage data aggregator 37.

The notification request message includes the information in respective data fields, as discussed above and shown in Table 1, including for example an indication of the type of event causing the infraction, identification of the account and the MDN of the mobile station 15 that caused the infraction. At step S2, the CCES notification server 55 parses the notification request to form a corresponding XML request message and delivers the XML version of the message to the CCC notification request processor 47.

The CCC notification request processor 47 uses an event identification and/or a notification type identification, from the parsed (now XML) notification request message, to access the business rule database 49, to retrieve one or more applicable business rules (step S3). For example, the applicable business rule may indicate that there is be a preference lookup, and if the system supports lookups for different types or sets of subscriber preference information, the business rule may also indicate the appropriate one of several possible types of preference lookup. In the present example, the voice call usage infraction should generate a notification to the account holder (in addition to a notification to the MDN of mobile station 15 that committed the infraction). Hence, the business rule specifies a need for a preference lookup and indicates a particular type of preference lookup so as to obtain a destination address of the subscriber designated account holder.

Hence, in step S4 in the example of FIG. 4, the CCC notification request processor 47 will do an LDAP lookup to a system of record, that is to say the preference center directory 53 in the implementation of FIG. 2, to obtain the MDN of the account holder's mobile station 13. The lookup could provide other delivery point destination information, although for this example, we will assume that the lookup identifies only the account holder MDN of the station 13.

In step S5, the CCC notification request processor 47 processes the notification request. In this example, the processing at S5 will entail generation of two SMS messages, one to the MDN of the mobile station 15 that committed the infraction and another to the MDN of the account holder's mobile station 13. This will typically entail obtaining a template of the appropriate notification message from the database 51 and filling-in appropriate fields of the template with the relevant data, obtained from the notification request message and/or from the system of record lookup in step S4. In step S6, the customer communication system 41 sends the SMS messages to the infracting MDN (i.e. to the mobile station 15) and to the account holder's MDN (i.e. to the mobile station 13).

In an exemplary implementation, the usage control example with infraction notifications is configured to provide only SMS notifications, addressed to the MDN designated for the account holder and/or addressed to the MDN of the station operating in a manner that produced the usage control infraction. The customer communication system 41, however, supports a variety of other user or account holder notifications as well as configurations in which notifications are provided to alternate destinations by alternate delivery techniques in the event of initial deliver failure. Although developed for other enterprise applications, such additional or alternate notification techniques could be applied to the infraction notifications, as well.

The flow chart of FIG. 5 shows some aspects of exemplary processing by the customer communication system 41 in somewhat more detail. Processing begins at step S11 when there is a trigger of notification regarding an infraction with regard to an MDN of a mobile station under an account have usage control, for example by the mo station 15. The message is parsed at S12 and delivered to the CCC request processor 47, essentially the same as steps S1 and S2 in the process discussed above relative to FIG. 4.

As discussed above, the notification request message includes the information in respective data fields, including for example an indication of the type of event causing the infraction, identification of the account and the MDN of the mobile station 15 that caused the infraction. In step S13, he notification request message may also specify a type of notification. Based on information from the parsed (now XML) notification request message, the CCC notification request processor 47 accesses the business rule database 49, to retrieve one or more applicable business rules (in a manner similar to the operation in step S3 of FIG. 4).

However, for purposes of discussion of FIG. 5, we will assume that the customer communication system 41 supports a wider range of message options, for at least some of the enterprise applications that utilize the notification services of the customer communication center. In this scenario, notifications may be sent via text message, Email, letter, and fax. Each notification request (after S12) conforms to the CCC XML schema that defines the elements needed to send the notification including the request type. Business rules for each request type are used to control the logic for the notification and can include a preference center check. Hence, each business rule will include a field or parameter specifying whether or not a preference check/lookup is required, and if so, a particular one of the various possible types of preference lookups that the system can perform for notification processing.

At step S14 in the example of FIG. 5, the CCC notification request processor 47 examines the applicable business rule to determine if the notification processing for the received request requires a check of the system of record, that is to say, whether a preference check is needed for processing of the received notification request message. If not, the processing branches from S14 to step S21 at which step the customer communication system 41 sends an SMS message to the mobile station (using the MDN of the station from the currently received notification request message). Of note, notification requests regarding infractions would pull up a business rule requiring a preference check. At step S14, if the processor determines that a check of the system of record is appropriate, the processing branches from S14 to step S15, in which the CCC notification request processor 47 does an LDAP lookup to the system of record in the preference center directory 53 to obtain the relevant subscriber preference information.

In this example, the preference center directory is a system of record for storage of the customer's notification preference(s) and the designated MDN for the Account Holder for all MDNs subject to usage control. In the example, the system supports four types of preference checks, to lookup various different types or sets of subscriber preference data, based on the type of lookup specified in the applicable business rule. The processing branches below S15 based on the type of preference lookup specified by the applicable business rule.

As in the earlier example, the preference information stored in the subscriber's account record in the directory 53, at least for usage control infraction notifications, includes the MDN of the station 13 designated as that of the account holder for the account containing the MDN that is the subject of the detected infraction. However, this information may also include other subscriber preference information regarding notifications for use in a number of branchings (among steps S16 to S19) in the process flow, depending on the trigger event, the requested type of notification and thus the type of preference lookup determined from the applicable business rule.

The preference center check is made with a web service call that responds in XML with the details from LDAP. The example of FIG. 5 supports four preference types for different notification procedures, for infraction notifications and/or for other notification services supported by the customer communication system 41. The exemplary preference lookups and corresponding notifications are as follows:

AE A Preference Center lookup to determine the Email address of the Account Holder for sending primary notifications using the account number for the infracting MDN (step S16);

AH A Preference Center lookup to determine the MDN and Email address of the Account Holder for sending primary notifications using the account number for the infracting MDN (step S17);

AS A Preference Center lookup to determine the MDN of the Account Holder for sending primary notifications using the account number for the infracting MDN (step S18); and UC A Preference Center lookup to determine the MDN of the Account Holder for sending secondary notifications using the account number for the infracting MDN, which is used for usage control (step S19).

Typically, infraction processing under usage control might use only the UC type lookup, whereas other services or applications would use the other approaches. However, the infraction notification service could be configured to use other lookups, e.g. for certain accounts/subscribers or in the event of an SMS message delivery failure.

After the Preference Center lookup is finished the appropriate notification destinations in the XML are updated with the LDAP details that were received. This may entail a modification at step S20 of the notification request with the details obtained from the applicable preference center lookup (from one of steps S16 to S19).

An aspect of a business rule (or a different rule triggered on delivery failure) may be used to indicate that a request type must also follow hierarchical delivery rules in the event of a failure of one or more of the message transmissions. If the business rule for such fail-over is set to yes, then the Email address in Preference Center check will only be used if it is over 30 days old.

After the notification request XML is modified as needed in step S20, notifications are sent using the details in the modified request at step S21. Notifications are sent to the infracting MDN of mobile station 15, and one or more notifications are sent to the account holder. Further notifications can be sent based on the failure of a prior notification. For example, if the SMS message transmission to the account holder MDN fails, the system may send an e-mail message to an address of the account holder. Then, if the e-mail transmission fails, there might be a letter or facsimile transmission, and so on. This approach allows the Account Holder to receive notifications associated with MDNs under their account when those MDNs trigger, or receive, various notifications via a series of subscriber selected delivery techniques that increase the likelihood of successful notification delivery to the account holder. Similar failover options may also be provided for the notification communications to the infracting MDN user.

In the examples outlined above, usage control is a real-time control feature that offers the account holder the ability to manage their billable usage and place restrictions on the mobile devices under their account, e.g. as a parental control service, usage control allows a parent to control usage of the mobile devices of their children. Usage control features may include: voice-warning limits, messaging limits, data transport limits, time of day restrictions, and communication block list. The notification services will facilitate all communications in real-time to the customers that provision the usage control feature.

In our example, usage control is an opt-in service managed by the subscriber or account holder only. Features within the service are also opt-in. A network subscriber is not obligated to have usage controls, and a network subscriber that does have usage controls is not obligated to have or activate all features of the service. Account holders can opt-in to the service via web site access, for example, through MyAccount or the like on the carrier's web site implementation. Configuration of usage control settings available through MyAccount enables the subscriber to configure each of their MDNs. Usage control SMS messages to mobile devices, subscribers and/or users may be provided for free and do not debit the message limit set by the parent or account holder or any price plan text messaging allowance. The designation of an MDN as that of the Account Holder may be determined by the customer via the web applications, for example, via MyAccount Access Management if implemented on the carrier's web site.

The following discussion provides an outline of the usage control service, with the notifications regarding infractions, as may be implemented on the network of Verizon Wireless, the assignee of the present application.

I. General Text Message Information a. Messages are limited to 159 characters, including VZW FREE MSG, for English and "Msj gratis VZW" or "Mensaje Gratis de VZW" for Spanish.

b. The requests will include a language indicator that will determine in what language the message will be sent.

c. Messages will be sent out real-time, when the request arrives from the data aggregator.

d. The delivery address for any notifications to the AH MDN will be designated by the entries in the Preference Center. If there is no AH MDN recorded in the Preference Center, then no AH-designated SMS will be sent.

e. If the AH MDN is the same as the infracting MDN, then the AH message will not go out. This check/process will be in place for every event that triggers a message to the infracting and the AH MDNs.

II. Voice Plan Management—In one example, nearing (t-X) or reaching the user-configured threshold will trigger a free message to the infracting MDN. Reaching the user-configured limit (t) will also trigger a free SMS to the parent Account Holder (AH). Table 2 below shows details of an example of the messaging provided in the event that the voice usage for the mobile station associated with a particular MDN reaches a threshold near a maximum usage limit (t) and/or reaches the usage limit (t). In a current example, the threshold is set at a level t-X where, X is some number of units below the subscriber selected hard limit t set for that mobile station and MDN.

TABLE 2

| Recipient | Description | Text Content |
|---|---|---|
| AH User | Nearing voice management limit Sent one time, not each event occurrence GRID REFERENCE: TXT 3 | English VZW FREE MSG: You have XX voice minutes remaining in your allowance set by the account owner. 93 characters Spanish MSJ GRATIS VZW: Le quedan XX minutos de voz en su asignacion establecida por el titular de la cuenta. 101 characters |
| AH User | Voice management limit reached Sent one time, not each event occurrence GRID REFERENCE: TXT A | English VZW FREE MSG: XXX-XXX-XXXX has reached their voice allowance for this bill cycle. They can continue to make/receive calls and will be billed per your plan. 157 characters Spanish MSJ GRATIS VZW: XXX-XXX-XXXX alcanzo su asignacion de mensajes de voz para este ciclo de facturacion. Podra hacer/recibir llamadas facturadas segun su plan. 156 characters |
| AH User | Voice management limit reached Sent one time, not each event occurrence GRID REFERENCE: TXT 9 | English VZW FREE MSG: You have reached your voice minutes allowance set by the account owner for this bill cycle. 106 characters Spanish MSJ GRATIS VZW: Usted ya alcanzo su asignacion de minutos de voz establecida por el titular de la cuenta para este ciclo de facturacion. 136 characters |

In the example, if the voice call limit is reached, Mobile Terminated (MT) and Mobile Originated (MO) calls will be blocked unless directed to MDNs of other mobile stations included under the particular account.

III. Block List Voice and Messaging Requirements—When a user attempts to send a message or make a voice call to a block-listed number, they will receive a denied service message (free SMS) indicating to the user that they cannot send messages to block-listed numbers. Their attempt will not be debited from their limit. Table 3 below shows details of an example of the messaging provided in the event that the user of the mobile station associated with a particular MDN attempts to send a message to a number that has been listed as blocked with respect to the particular mobile station and sending MDN. Although not shown in this example, notifications could also be provided to the account holder.

TABLE 3

| Recipient | Description | Text Content |
|---|---|---|
| AH User | An SMS message to or from a block listed number. Sent for every occurrence. GRID REFERENCE: TXT 1 | English VZW FREE MSG: You cannot send messages to or receive messages from phone numbers that are blocked by the account owner. 118 characters Spanish MSJ GRATIS VZW: Usted no puede enviar a o recibir mensajes de numeros de telefono que estan bloqueados por el titular de la cuenta. 129 characters |
| AH User | An attempted MMS message to a block listed number. Sent for every occurrence. Note: The requests for this message will only be for VZW subscribers. GRID REFERENCE: TXT 4 | English VZW FREE MSG: Your message cannot be delivered. The phone number you are attempting to send a message to has been blocked by the account owner. 144 characters Spanish MSJ GRATIS VZW: Su mensaje no puede ser entregado. El numero de telefono al que intenta llamar fue bloqueado por el titular de la cuenta. 135 characters |
| AH User | Attempt to call a block listed number. Sent for every occurrence. GRID REFERENCE: TXT 1.1 | English VZW FREE MSG: Your call cannot be completed as dialed. The phone number you are attempting to call has been blocked by the account owner. 138 characters Spanish MSJ GRATIS VZW: Su llamada no puede completarse como la marco. El numero de telefono al que intenta llamar ha sido bloqueado por el titular de la cuenta. 151 characters |

IV. Functionality of Messaging Plan Management—Nearing (t-X) or reaching the user-configured threshold will trigger a free SMS to the infracting MDN. Reaching the user-configured limit will also trigger a free SMS to the parent Account Holder (AH). Table 4 below shows details of an example of the messaging provided in the event that the SMS message usage for the mobile station associated with a particular MDN reaches a threshold near a maximum usage limit, typically set at a level t-X which is X units below the hard limit t set for that mobile station and MDN and when usage reaches the limit t. Similar controls and messaging could be provided for MMS messaging and data (e.g. web surfing) usage, if accounted separately.

TABLE 4

| Recipient | Description | Text Content |
|---|---|---|
| AH User | Nearing the messaging plan management limit Sent one time, not each event occurrence GRID REFERENCE: TXT 5 | English VZW FREE MSG: You have XX messages remaining in your allowance set by the account owner. 88 characters Spanish MSJ GRATIS VZW: Le quedan XX mensajes en su asignacion establecida por el titular de la |

TABLE 4-continued

| Recipient | Description | Text Content |
|---|---|---|
| AH | Messaging plan | cuenta.<br>95 characters<br>English |
| User | management limit reached.<br>Sent one time, not each event occurrence<br>GRID REFERENCE: TXT B | VZW FREE MSG:<br>XXX-XXX-XXXX has reached their messaging allowance and can only send/receive messages to users that are "IN" until the next bill cycle.<br>149 characters<br>Spanish<br>MSJ GRATIS VZW:<br>XXX-XXX-XXXX alcanzo su asignacion de mensajeria y solo puede enviar/recibir a y de usuarios "IN" hasta el siguiente ciclo de facturacion.<br>158 characters |
| AH | Messaging plan | English |
| User | management limit reached.<br>Sent one time, not each event occurrence<br>GRID REFERENCE: TXT 11 | VZW FREE MSG: You have reached your messaging allowance for this bill cycle set by the account owner.<br>76 characters<br>Spanish<br>MSJ GRATIS VZW: Usted ya alcanzo su asignacion de mensajes establecida por el titular de la cuenta para este ciclo de facturacion.<br>130 characters |

If the maximum message limit is reached, Mobile Terminated (MT) messages will not be delivered and Mobile Originated messages will not be sent. When messaging reaches the actual limit, additional notifications may be provided as explained in Table 5 below. Of course, further notifications could be provided to the account holder as well.

TABLE 5

| Recipient | Description | Text Content |
|---|---|---|
| AH | Messaging plan | English |
| User | management limit reached<br>Sent for every occurrence.<br>SMS MO MT<br>MMS MO<br>GRID REFERENCE: TXT 14 | VZW FREE MSG: Messages cannot be sent or received. You have reached your messaging allowance set by the account owner for this bill cycle.<br>138 characters<br>Spanish<br>MSJ GRATIS VZW: No se pueden enviar o recibir mensajes. Ya alcanzo su asignacion de mensajes establecida por titular de cuenta para este ciclo de facturacion.<br>157 characters |

V. Time of Day (TOD) Restrictions (Messaging and Data Services) Requirements—Account holders can designate the days and times when a device in the account cannot be used for messaging or application download during a 1 week (7 day) interval. When a user attempts to send a message during designated restricted times a free denied service message will alert the user that they cannot send messages to anyone outside their account until 'XXX' time. 'XXX' is a time determined from the restricted times set in usage control profile. The attempt will not count towards their limit.

A free SMS message will be sent every time an attempt to violate the Time of Day restriction occurs. This will result in multiple messages, possibly a succession of multiple messages, to the same MDN during the TOD Restriction period.

Table 6 below shows details of an example of the messaging that may be provided in the event of infractions regarding time of day restrictions. Although this example shows only messages to the users addressed to the infracting MDNs, notifications could also be sent to the account holder as discussed earlier.

TABLE 6

| Recipient | Description | Text Content |
|---|---|---|
| AH | Time of Day | English |
| User | restriction for messaging.<br>Sent for every occurrence.<br>SMS MO MT<br>MMS MO<br>GRID REFERENCE: TXT 2.1 | VZW FREE MSG: Your phone has been restricted by the account owner. You cannot send or receive messages until the time of day restriction ends.<br>142 characters<br>Spanish<br>MSJ GRATIS VZW: Su telefono fue restringido por el titular de la cuenta. No podra enviar/recibir mensajes hasta la hora del dia en que finaliza la restriccion.<br>157 characters |
| AH | Time of Day | English |
| User | restriction for downloading content or web browsing.<br>Sent for every occurrence.<br>GRID REFERENCE: TXT 2.2 | VZW FREE MSG: Your use has been restricted by the account owner. You can't download content or use certain applications until the time of day restriction ends.<br>159 characters<br>Spanish<br>MSJ GRATIS VZW: Su uso fue restring. por el titular de la cuenta.<br>No podra bajar conten./usar ciertas aplic. hasta la hr. del dia que finaliza la restriccion.<br>156 characters |

As shown by the above discussion, functions relating to the detection of an infraction by a mobile station or its user (with respect to an assigned MDN) and the attendant infraction notification service to the user and/or to the account holder may be implemented on computers connected for data communication via the components of various network, configured to provide mobile communication services and related service features, as shown in FIGS. 1 to 3. Although special purpose devices may be used, such computers also may be implemented using one or more hardware platforms intended to represent a general class of data processing device commonly used to run "server" and/or "client" programming so as to implement the functions discussed above, albeit with an appropriate network connection for data communication.

As known in the data processing and communications arts, a general-purpose computer typically comprises a central processing unit (CPU) or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the business rules, template and preference center databases. The software code is executable by the general-purpose computer that functions as the usage data aggregator and/or the server(s) forming the customer communication system. In operation, the respective code is stored within the particular general-purpose computer platform. At other times, however, the software may be stored at other locations and/or transported for loading into the appropriate computer platform. Execution of such code by a processor of the computer platform enables the platform to implement the respective processing steps of the infraction detection and notification methodology, in essentially the manner performed in the implementations discussed and illustrated herein.

Figures 6, 7:
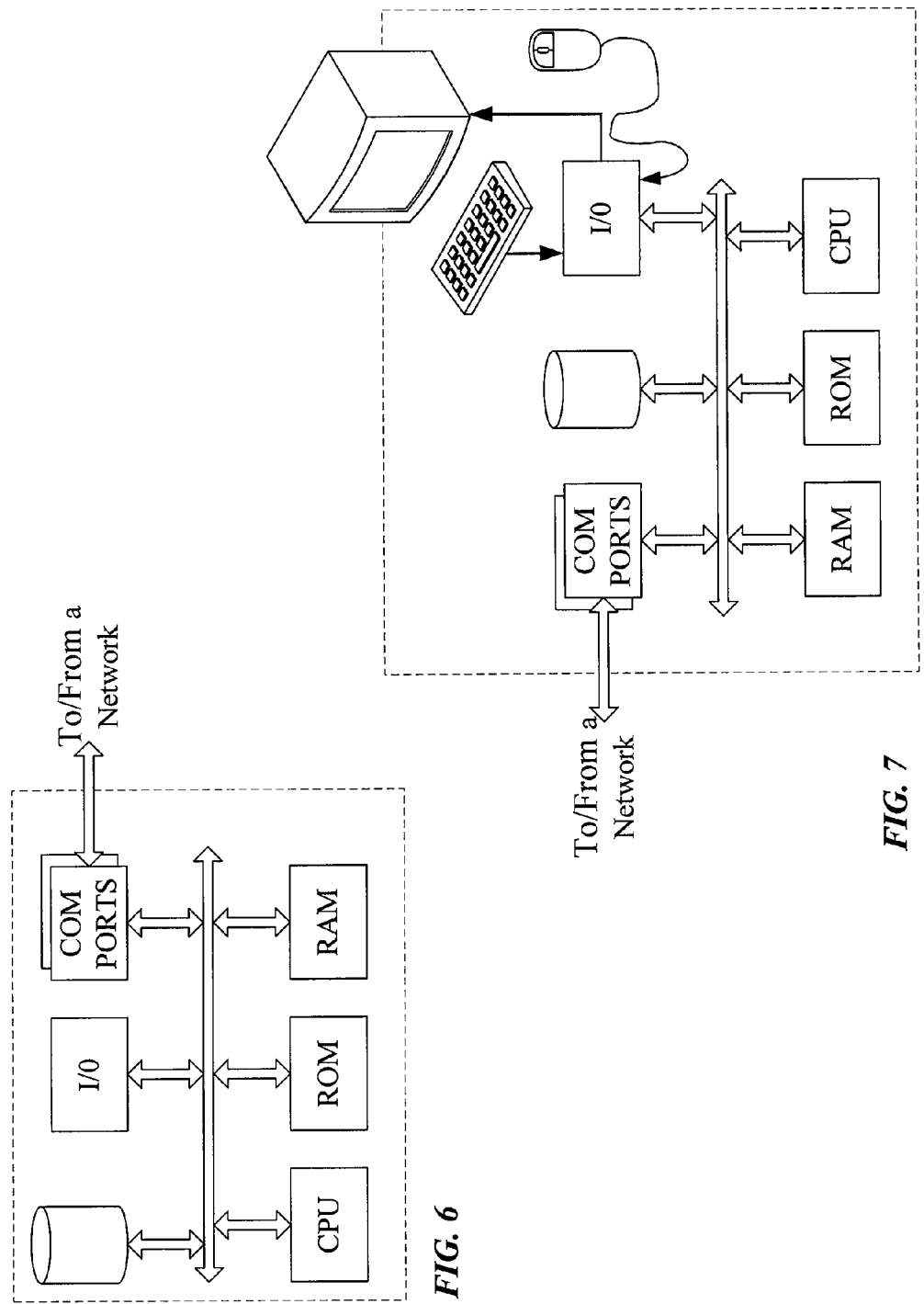
FIG. 6 is a simplified functional block diagram of a computer that may be configured as a host or server.
FIG. 7 is a simplified functional block diagram of a personal computer or other work station or terminal device.

FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a personal computer (PC) or other type of work station or terminal device, although the computer of FIG. 7 may also act as a server if appropriately programmed. It is believed that those skilled in the art are familiar with the structure, programming and general operation of such computer equipment and as a result the drawings should be self-explanatory.

The hardware elements, operating systems and programming languages of such computers are conventional in nature, and it is presumed that those skilled in the art are adequately familiar therewith. Of course, the server functions may be implemented in a distributed fashion on a number of similar platforms, to distribute the processing load (as illustrated by way of example in FIG. 3).

Hence, aspects of the methods of providing notifications of infractions of mobile station usage restrictions outlined above may be embodied in programming. Program aspects of the technology may be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another, for example, from a management server or host computer of the network operator or carrier into the computer platform of the data aggregator and/or the computer platform(s) that serve as the customer communication system. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the data aggregator, the customer communication system, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementations described above utilized SMS type messages as the initial notification messages to the party that committed the infraction and to the account holder, other electronic messages to their mobile stations may be used for those notifications, such as MMS type messages.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

ACT—Billing ACcounT ID
ADR—Address
AH—Account Holder
API—Application Programming Interface
APP—Application ID
BAL—BALance of remaining allowance
BS—Base Station
BTS—Base Transceiver System
CD—Compact Disk
CD-ROM—Compact Disk-Read Only Memory
CCC—Customer Communication Center
CCES—Customer Care Enterprise Services
CCS—Customer Communications System
CSS—Content Services Switch
DIR—call DIRection
DNS—Domain Name Service
DOY—Date of Year
DVD—Digital Video Disk DVD-ROM—Digital Video Disk-Read Only Memory
ECS—Enterprise Communication Services
EMS—Enhanced Messaging Service
EEPROM—Electrically Erasable Programmable Read Only Memory
EPROM—Erasable Programmable Read Only Memory
EVT—notification EVenT
FCC—Federal Communications Commission
GSS—Global Site Selector
HTTP—Hypertext Transfer Protocol
ID—Identifier
IP—Internet Protocol
IR—InfraRed
JVM—Java Virtual Machine
LNG—preferred LaNguaGe
LDAP—Lightweight Directory Access Protocol
MDN—Mobile Director Number
MGB—Megabytes data
MIN—Mobile Identification Number
MMS—Multimedia Message Service
MO—Mobile Originated
MQ—Message Queuing
MS—Mobile Station
MSG—Message numbers
MT—Mobile Terminated
PROM—Programmable Read Only Memory
PSTN—Public Switched Telephone Network
RAM—Random Access Memory
RAN—Radio Access Network
RF—Radio Frequency
ROM—Read Only Memory
SMPP—Short Message Peer-to-Peer
SMS—Short Message Service
SMSC—Short Message Service Center
TCP—Transmission Control Protocol
TCP/IP—Transmission Control Protocol/Internet Protocol
TOD—Time of Day
TOS—Type of Service
UC—Usage Control
UCS—for usage control service
UNI—UNIt of remaining allowance
USD—US dollars
VZW—VeriZon Wireless
WAN—Wide Area Network
XML—eXtensible Markup Language

What is claimed is:

1. A method of notifying an account holder of an infraction of a restriction regarding communication by a mobile station, comprising steps of:
   detecting an infraction of an account holder selected restriction, on usage of one of a plurality of mobile stations associated with an account of the account holder with a mobile communication network, caused by operation of the one mobile station through the mobile communication network;
   responsive to detecting the infraction of the account holder selected restriction, obtaining a destination address designated for the account holder of the account associated with the one mobile station having caused the infraction; and
   using the destination address, sending a notification of the infraction intended for the account holder of the account associated with the one mobile station having caused the infraction.

2. The method of claim 1, wherein:
   the destination address identifies a mobile station of the account holder for communications through the mobile communication network, other than the one mobile station; and
   the step of sending comprises sending a message providing the notification of the infraction through the mobile communication network for the mobile station of the account holder, using the destination address.

3. The method of claim 2, wherein the destination address comprises a mobile directory number (MDN) assigned to the mobile station of the account holder.

4. The method of claim 2, wherein the MDN is one selected by the account holder from among mobile directory numbers assigned to the mobile stations under the account.

5. The method of claim 2, wherein the message providing the notification of the infraction comprises a short message service (SMS) message.

6. The method of claim 2, further comprising:
   detecting a failure in the sending of the notification of the infraction for the account holder using the destination address; and
   upon detecting the failure, using an alternate destination address for sending the notification of the infraction intended for the account holder.

7. The method of claim 6, wherein the alternate destination address is an e-mail address, a mail address for a letter or an address for a facsimile communication.

8. The method of claim 1, wherein the destination address is a selected one of a telephone number, an e-mail address, a mail address for a letter and an address for a facsimile communication.

9. The method of claim 1, further comprising sending a notification of the infraction intended for a user of the one mobile station.

10. The method of claim 9, wherein the message providing the notification of the infraction for the user of the one mobile station comprises a short message service (SMS) message addressed to the one mobile station.

11. The method of claim 1, wherein the infraction is an infraction of a usage control restriction selected from the group consisting of: a voice call usage threshold, a voice call usage maximum limit, a message communication usage threshold, a message communication maximum limit, a data communication usage threshold, a data communication maximum limit, a blockage restriction for communication with regard to an identified station of another party, and a time of day restriction.

12. The method of claim 1, wherein:
   the account holder selected restriction comprises one of a plurality of restrictions selected from among a plurality of restrictions offered by a carrier providing service through the mobile communication network;
   the one restriction is selected from among the plurality of restrictions by the account holder; and
   at least one parameter of the selected restriction is set by the account holder.

13. The method of claim 12, wherein the destination address identifies a mobile station of the account holder for communications through the mobile communication network, selected by the account holder from among the mobile stations under the account.

14. An article of manufacture, comprising:
   a machine readable storage medium; and
   executable program instructions embodied in the machine readable storage medium, wherein execution of the program instructions by a programmable system coupled to a mobile communication network causes the system to perform functions for notifying an account holder of an infraction of a restriction regarding communication by a mobile station, the functions comprising:
(a) detecting an infraction of an account holder selected restriction, on usage of one of a plurality of mobile stations associated with an account of the account holder with a mobile communication network, caused by operation of the one mobile station through the mobile communication network;
(b) responsive to detecting the infraction of the account holder selected restriction, obtaining a destination address designated for the account holder of the account associated with the one mobile station having caused the infraction; and
(c) using the destination address, sending a notification of the infraction intended for the account holder of the account associated with the one mobile station having caused the infraction.

15. The article of claim 14, wherein:
the destination address identifies a mobile station of the account holder for communications through the mobile communication network other than the one mobile station; and
the function of sending comprises sending a message providing the notification of the infraction through the mobile communication network for the mobile station of the account holder, using the destination address.

16. The article of claim 14, wherein the functions performed upon execution of the program instructions by the programmable system further comprise:
detecting a failure in the sending of the notification of the infraction for the account holder using the destination address; and
upon detecting the failure, using an alternate destination address for sending the notification of the infraction intended for the account holder.

17. The article of claim 16, wherein the alternate destination address is an e-mail address, a mail address for a letter or an address for a facsimile communication.

18. The article of claim 14, wherein the functions performed upon execution of the program instructions by the programmable system further comprise sending a notification of the infraction intended for a user of the one mobile station.

19. The article of claim 18, wherein the message providing the notification of the infraction for the user of the one mobile station comprises a short message service (SMS) message addressed to the one mobile station.

20. The article of claim 14, wherein the infraction is an infraction of a usage control restriction selected from the group consisting of: a voice call usage threshold, a voice call usage maximum limit, a message communication usage threshold, a message communication maximum limit, a data communication usage threshold, a data communication maximum limit, a blockage restriction for communication with regard to an identified station of another party, and a time of day restriction.

21. The article of claim 14, wherein:
the account holder selected restriction comprises one of a plurality of restrictions selected from among a plurality of restrictions offered by a carrier providing service through the mobile communication network;
the one restriction is selected from among the plurality of restrictions by the account holder; and
at least one parameter of the selected restriction is set by the account holder.

22. The article of claim 21, wherein the destination address identifies a mobile station of the account holder for communications through the mobile communication network, selected by the account holder from among mobile the mobile stations under the account.

23. A mobile communication network, comprising:
a traffic network for providing mobile communications services to mobile stations of subscribers;
a usage data aggregator coupled to the traffic network, for monitoring usage of identified mobile stations including one of a plurality of mobile stations associated with an account of one of the subscribers, and for generating a notification request message upon determining that operation of the one mobile station through the mobile communication network has involved an infraction of a usage restriction selected by the one subscriber; and
a customer communication system, in communication with the usage data aggregator, for receiving the notification request message, for obtaining a destination address designated for a holder of the one subscriber's account associated with the one mobile station having caused the infraction responsive to the notification request message, and for sending a notification of the infraction intended for the holder of the one subscriber's account associated with the one mobile station having caused the infraction using the destination address.

24. The mobile communication network of claim 23, wherein the customer communication system, comprises:
a business rules database, storing rules for determining processing of notification request messages;
a preference center directory, for storing subscribers' preference information regarding notifications to be sent by the system, wherein the destination address designated for the holder for the one subscriber's account is obtained from the preference center directory, based on an applicable one of the business rules; and
a notification request processor, for modifying the notification request message from the usage data aggregator, to add the destination address for the holder of the one subscriber's account, to cause the customer communication system to send the notification of the infraction using the destination address.

25. The mobile communication network of claim 24, wherein the customer communication system further comprises a notification server for receiving the notification request message from the usage data aggregator in a first format utilized by the usage data aggregator and converting the notification request message into a second format utilized by the notification request processor.

26. The mobile communication network of claim 25, wherein the conversion by notification server parses the notification request to form a corresponding XML notification request message and delivers the XML notification request message to the notification request processor.

27. A customer communication system for notifying an account holder of an infraction of a restriction regarding communication by a mobile station, the customer communication system comprising:
a business rules database, storing rules for determining processing of notification request messages received from a mobile communication network;
a preference center directory, for storing account holders' preference information regarding notifications to be sent by the system; and
a notification request processor, for:
(a) receiving a notification request message from a usage data aggregator monitoring mobile station usage through the communication network, the received notification request message indicating that operation of one of a plurality of mobile stations associated with an account of a subscriber has involved an infraction of a usage restriction selected by the account holder of the subscriber account, and the received notification request message identifying the one mobile station;

(b) based on an applicable one of the business rules, obtaining a destination address designated for the account holder responsive to the notification request message, from a record for the account in the preference center directory; and (c) modifying the notification request message from the usage data aggregator, to add the destination address, to cause the customer communication system to send the notification of the infraction using the destination address, the notification of the infraction identifying the one mobile station.

28. The customer communication system of claim 27, further comprising a notification server for receiving the notification request message from the usage data aggregator in a first format utilized by the usage data aggregator and converting the notification request message into a second format utilized by the notification request processor.

29. The customer communication system of claim 28, wherein the conversion by notification server parses the notification request to form a corresponding XML notification request message and delivers the XML notification request message to the notification request processor.

* * * * *